United States Patent
Jessen

[11] Patent Number: 5,961,661
[45] Date of Patent: Oct. 5, 1999

[54] CERAMIC STRUCTURE WITH BACKFILLED CHANNELS

[75] Inventor: Todd Jessen, Alexandria, Va.

[73] Assignee: The United States of America as represented by the Secretary of the Navy, Washington, D.C.

[21] Appl. No.: 09/154,090

[22] Filed: Sep. 16, 1998

Related U.S. Application Data

[62] Division of application No. 08/771,119, Dec. 20, 1996, Pat. No. 5,866,244.

[51] Int. Cl.$^6$ .......................... C04B 35/622; C04B 35/80
[52] U.S. Cl. ...................... 264610/1; 264/629; 264/640; 264/641; 264/624; 264/625; 264/626
[58] Field of Search .................................. 264/610, 629, 264/640, 641, 624, 625, 626

[56] References Cited

U.S. PATENT DOCUMENTS

| | | | |
|---|---|---|---|
| 3,873,328 | 3/1975 | Brueggeman et al. | 501/95.1 |
| 4,010,884 | 3/1977 | Rothman | 428/293.4 |
| 4,158,687 | 6/1979 | Yajima et al. | 501/95.2 |
| 4,599,256 | 7/1986 | Vasilos | 428/293.7 |
| 4,764,488 | 8/1988 | Saito et al. | 501/95.2 |
| 4,781,993 | 11/1988 | Bhatt | 428/293.4 |
| 4,837,230 | 6/1989 | Chen et al. | 501/95 |
| 4,853,020 | 8/1989 | Sink | 65/31 |
| 4,869,943 | 9/1989 | Corbin et al. | 501/95.2 |
| 4,933,309 | 6/1990 | Luthra | 501/95.2 |
| 5,039,635 | 8/1991 | Stempin et al. | 501/95.2 |
| 5,043,303 | 8/1991 | Singh et al. | 428/293.4 |
| 5,057,465 | 10/1991 | Sakamoto et al. | 501/95.2 |
| 5,132,155 | 7/1992 | Singh et al. | 428/293.7 |
| 5,166,004 | 11/1992 | Bose et al. | 428/293.7 |
| 5,254,397 | 10/1993 | Kenai et al. | 428/293.7 |
| 5,264,722 | 11/1993 | Tonucci et al. | 65/31 |
| 5,281,559 | 1/1994 | Bensal | 501/95.2 |
| 5,422,319 | 6/1995 | Stempin et al. | 501/95.2 |

*Primary Examiner*—James Derrington
*Attorney, Agent, or Firm*—Thomas E. McDonnell; George A. Kap

[57] ABSTRACT

Ceramic structure having therein reinforcing fibers and backfilled strands is prepared by the arranging tows of fugitive and reinforcing fibers parallel to each other to form a fiber preform, contacting the preform with a matrix precursor whereby the precursor deposits around the fibers, removing the preform from the precursor wherein the fibers are coated with the precursor, drying the preform to solidify the precursor on the fibers and to convert the precursor to a matrix form, calcining the preform to convert the matrix form on the fibers to another matrix form, removing the fugitive fibers from the preform to form channels therein, backfilling the channels with a material, and hot pressing the preform for densification purposes to form the ceramic structure containing spaced fibers and spaced backfilled material strands disposed in the matrix.

6 Claims, 1 Drawing Sheet

CERAMIC STRUCTURE WITH BACKFILLED CHANNELS

This application is a division of application Ser. No. 08/771,119, filed Dec. 20, 1996, now U.S. Pat. No. 5,866,244.

BACKGROUND OF INVENTION

1. Field of Invention

This invention pertains to the field of a ceramic structure containing backfilled material and to a process for making same.

2. Description of Prior Art

The use of continuous ceramic fibers to enhance mechanical performance of ceramic structures is well established. Same is true of the use of a thin coating on the fiber surface to provide weak interfacial bonding between fiber and the matrix within which the fiber is disposed. The weak interfacial bonding between the fiber and the matrix is recognized as the main factor contributing to enhancement of mechnical property in continuous fiber ceramic matrix composites (CFCMCs) or ceramic structures.

Until recently, it was generally accepted that mechanical behavior of CFCMC was independent of fiber distribution. However, the inventor herein demonstrated that narrow channels distributed throughout the composite can significantly alter mechanical behavior of CFCMCs independently of the fiber surface treatment.

SUMMARY OF INVENTION

An object of this invention is a reinforced ceramic structure containing backfilled material in the form of continuous, spaced, parallel strands conforming to the outline of channels which has enhanced mechanical properties compared to a prior art reinforced ceramic structure devoid of the backfilled material.

Another object of this invention is a reinforced ceramic structure which has retained structural integrity on failure.

Another object of this invention is a reinforced ceramic article which is cheaper than prior art ceramic structure.

Another object of this invention is the controlled placement of reinforcing fibers to affect mechanical properties.

Another object of this invention is a process for making a reinforced ceramic structure characterized by the step of backfilling channels formed by fugitive fibers.

Another object of this invention is a process whereby placement of reinforcing and fugitive fibers can be controlled to achieve the desired properties.

These and other objects of this invention are realized by a reinforced ceramic structure of this invention made by a process characterized by a special heat treatment for removing fugitive fibers and backfilling the channels formed by the removed fugitive fibers.

DESCRIPTION OF PREFERRED EMBODIMENTS

This invention pertains to a ceramic structure containing backfilled material and to a process for making same.

The ceramic structure of this invention is a ceramic matrix containing reinforcing ceramic fibers and backfilled material in the form of parallel strands. The reinforcing fibers are typically spaced and parallel to each other and the strands are typically spaced from each other and parallel to the reinforcing fibers. The backfilled material can be same or different from the matrix.

The backfilled material typically extends from one end of the ceramic structure to the opposite end and is in a form of parallel, spaced, elongated strands which strands correspond to the shape of fugitive fibers.

Figure 1:
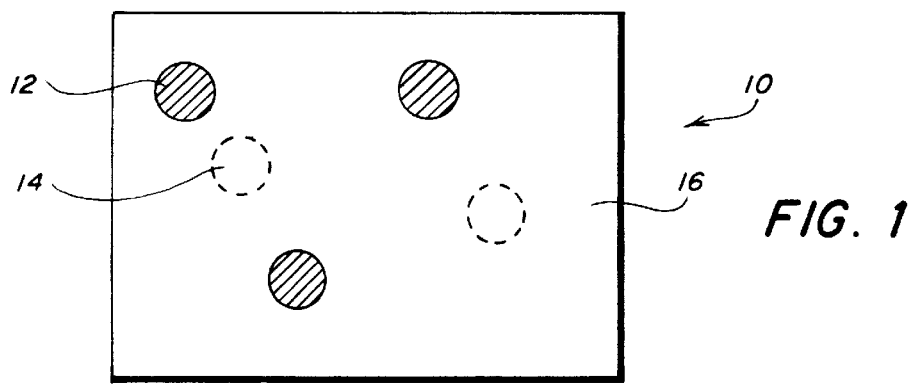
FIG. 1 is a schematic illustration of the top view of a reinforced ceramic structure of this invention showing reinforcing fibers and backfill material in a ceramic matrix.

FIG. 1 is a top view of a reinforced ceramic structure 10 wherein reinforcing fibers 12 and backfilled material 14 are disposed in ceramic matrix 16. Fibers 12 are in a tow and a matrix precursor is infiltrated between and around the fibers and then converted to a matrix.

The ceramic structure can include up to 80% by volume, preferably 20–70%, of the reinforcing fibers.

A wide variety of ceramic matrices can be used to make the ceramic structures. Suitable matrices include silicon nitride, silicon carbide, silica, 96% silica with 4% boron oxide, zirconia, titania, zirconia-titania mix, zirconium titanate, mullite and cordierite. The typical matrix is silicon carbide.

The ceramic reinforcing fibers can be made from single crystal or polycrystalline materials selected from silicon carbide; alumina; graphite; YAG oxide which is composed of yttrium oxide, aluminum oxide, and garnet oxide; mullite; and silicon nitride. Typically, the ceramic fibers are polycrystalline silicon carbide derived from polymer precursors.

The ceramic reinforcing fibers herein are typically continuous, which means that the aspect ratio thereof is at least 20, preferably at least 50, and especially at least 100.

Although the reinforcing and fugitive fibers may vary in thickness from a small fraction of a micron to 150 microns in diameter, the typical fiber thickness is from about 1 micron to about 50 microns, especially 5–20 microns. The fibers can be of any desired cross-section, however, the preferred cross-section is about circular. Fibers are usually coated by a protective sizing coating which burns away at an elevated temperature exceeding about 300° C.

Individual fibers can be many meters long arranged in tows which contain a varying number of fibers. Tows of 500 fibers and 6000 fibers, and others, are known and fibers in a tow are held together by natural forces without resort to any additional material or device. Fibers are arranged in tows for practical reasons, such as to facilitate handling thereof. An organic sizing can be used to bind fibers in a tow.

Each individual reinforcing fiber can have a coating thereon. Thickness of the coating may also vary over a broad range with good results. Coating thickness can be as thin as 0.05 micron and as thick as several tenths of a micron, such as 0.6, although typically, the coating thickness is 0.1–0.3 micron.

Suitable coatings are made from materials that can provide the advantages of the structures noted herein, including debonding at the interface of the coating and the matrix. Suitable coating materials include boron nitride and carbon, with boron nitride being the preferred coating material.

Fugitive fibers are used to create the channnels. Fugitive fibers are initially incorporated into a ceramic structure and are subsequently burned out by means of a special heat treatment before the hot pressing operation. During the special heat treatment, the fugitive fibers are removed leaving channels in the ceramic structure.

Fugitive fibers can be made of any material that can be removed without leaving a residue. Fugitive fibers are typically made of carbon or a polymeric material. Although vaporization by application of heat is the typical manner of removing the fugitive fibers, other approaches can also be used, including chemical etching.

Numerous fiber arrangement schemes with fugitive or fugitive with reinforcing fibers can be envisioned based on this invention's concept. An additional benefit beyond the general improvement in any desired property with this technique, is that, by simple rearrangement of the fiber schemes, either the strength or the fracture resistance or just about any another property can be adjusted for specific applications, without any additional processing or procedure change.

The ceramic structure of this invention can be made with fewer reinforcing fibers than prior art ceramic structures and have same or better mechanical properties than the prior art structures explain. With the cost of the fibers being about 100 times that of the matrix, it should be apparent that the structure of this invention can be made more cheaply than in the past. This scenario presupposes application of load in a direction parallel to the reinforcing fibers disposed in the matrix and results in catastrophic failure with no retention of structural integrity. If it is desired to use a ceramic structure which retains structural integrity on failure, the ceramic structure should be oriented so that direction of load is perpendicular to the enhanced or backfilled channels. An application of load in this manner to a ceramic structure, will cause the structure to deform and fail, but failure will not be catastrophic or complete. In such a situation, the structure will retain typically 40–70%, more typically 50–60% of its peak or maximum prefailure strength upon reloading.

When it is desired to make a reinforced ceramic structure of this invention, tows of fugitive and reinforcing fibers are laid up typically in a screen basket so that the fugitive and the reinforcing fibers comprise 20–80% by volume, preferably 30–70% of the finished ceramic structure. The volume ratio of fugitive fiber tows to reinforcing fiber tows can vary from 6:1 to 1:6, preferably from 4:1 to 1:4.

In arranging the tows of fugitive and reinforcing fibers in a screen basket, the tows are disposed in the basket so that they extend from one end of the basket to the opposite end. This arrangement of the tows will produce channels in the ceramic structure that extend from one end thereof to the opposite end. If it is desired to have channels in a ceramic structure that are closed at one or both ends, the tows are either off-set from one end of the basket or are disposed in the basket intermediate its ends. Typically, the tows are arranged in the basket from one end to the opposite so that the channels pass through the ceramic structure from one end thereof to the opposite end. Therefore, the term "channel" does not necessarily mean that the elongated opening extends from one end of the ceramic structure to the opposite end.

When the layup of the tows in the screen basket is finished, the screen basket is typically immersed in or contacted with a matrix precursor for a sufficient time to deposit a layer of the matrix precursor on and around the fibers in the tows. Deposition of the matrix precursor on the fibers can be achieved by capillary action. Deposition of the matrix precursor in this manner takes 0.1–5, preferably 0.5–2 hours.

After immersing the fiber preform in the matrix preform, it is then removed from the matrix precursor and dried over steam to convert the matrix precursor to a matrix form. To build-up a sufficient amount of the matrix, the screen basket can be lowered into the matrix precursor several times, each time followed by drying. Drying over steam typically takes 1–20, preferably 2–5 hours.

Typically, 1–15, more typically 5–10 infiltrations, each followed by drying, are necessary to build-up sufficient matrix precursor on the fibers. Voids between coated fibers can remain if an insufficient number of infiltrations are used. An excess number of infiltrations, after filling the voids between fibers with a matrix form, merely results in depositing a matrix form on the outside surfaces of the structure.

The ceramic structure is next calcined or heat treated to preserve the matrix in an amorphous state and to convert the matrix precursor to another matrix form. The calcining temperature is typically in the range of 500–700° C. and calcining duration is usually 0.5–2 hours. Calcination can be conducted in an inert atmosphere or in a room atmosphere. It is believed that better ceramic structures are obtained if calcination is made after about three immersions in the matrix precursor.

Following the first calcination step or after the fiber preform has acquired at least a semi-rigid body, the fiber preform is subjected to a special oxidizing heat treatment to remove or oxidize the fugitive fibers. The special heat treatment is carried out in an oxidizing atmosphere at 100–1000° C., especially 200–800° C. for 1–200, especially 20–100 hours. The special heat treatment is intended to oxidize the fugitive fibers to gaseous products leaving elongated voids or channels in their place.

After the special heat treatment, the ceramic structure is hot-pressed at an elevated temperature and pressure in a carbon monoxide or another reducing atmosphere. The hot-pressing step also converts one matrix form to the matrix. The use of a carbon monoxide atmosphere with a very small amount of oxygen, while not absolutely needed, is believed to reduce fiber degradation and to retard carbon and oxygen diffusion from the fibers. Hot pressing in the presence of carbon monoxide is typically carried out when silicon carbide reinforcing fibers are used. The carbon monoxide is typically at an overpressure in excess of 1 atmosphere, the hot-press temperature is typically in the range of 1200–1300° C. and the hot-press pressure is in the range of 15–35 MPa. The hot pressing operation typically takes 0.5–2 hours.

Following the hot-pressing operation, the ceramic structure is cooled to about room temperature and tested for mechanical properties. The ultimate strength and fracture toughness or fracture resistance, as determined by relative work-of-fracture comparisons, were measured at room temperature.

If the matrix precursor is a solution of zirconium n-propoxide and titanium isopropoxide in ethyl alcohol, drying under steam converts the alcoholates to respective hydroxides, calcination and the special heat treatment can convert the hydroxides to zirconium oxide ($ZrO_2$) and titanium oxide ($TiO_2$), and the hot pressing procedure converts the oxides to the zirconium titanate matrix. Until the final conversion, the matrix precursor is considered here as a matrix form.

Through the various steps of the process described herein, the fiber preform is referred to as such until after the pressing procedure, when it is referred to herein as the ceramic structure.

In summary, a ceramic structure of this invention can be made by a process that includes the following steps:

(a) arranging tows of elongated fugitive and reinforcing fibers parallel to each other to form a fiber preform, the fibers being 1–50 microns in diameter, (b) contacting the fiber preform with a matrix precursor whereby the matrix precursor deposits around the fibers, (c) removing the fiber preform from the matrix precursor wherein the fibers are coated with the matrix precursor, (d) drying the fiber preform to solidify the matrix precursor on the fibers and to convert the matrix precursor to a matrix form, (e) repeating steps (c) and (d) to built-up the matrix precursor/form on the fibers, (f) calcining the fiber preform to convert the matrix form on the fibers to another matrix form, (g) removing the fugitive fibers from the fiber preform to form elongated and parallel channels therein, (h) backfilling the channels with a material, and (i) hot pressing the fiber preform for densification purposes to form the ceramic structure containing spaced fibers and spaced backfilled material disposed in the ceramic matrix.

The invention having been generally described, the following examples are given as particular embodiments of the invention to demonstrate the practice and advantages thereof. It is understood that the examples are given by way of illustration and are not intended to limit in any manner the specification or the claims that follow.

EXAMPLE 1

This example demonstrates preparation of a ceramic structure of this invention which has improved mechanical properties at a lower loading of reinforcing fibers compared to a prior art structure.

Figure 2:
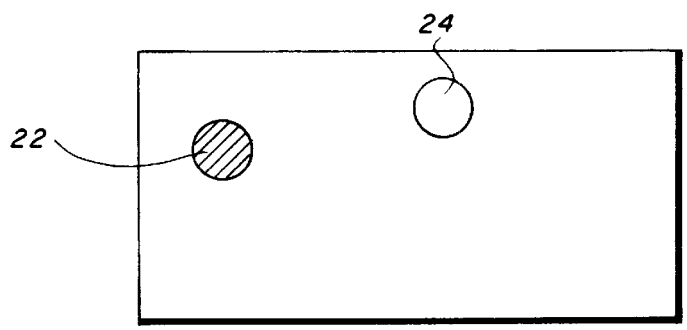
FIG. 2 is a schematic illustration of a fiber preform showing relative orientation of the reinforcing and fugitive fibers.

A number of fiber preforms of this invention were constructed by alternating the reinforcing fiber tows 22 and the fugitive fiber tows 24, as shown in FIG. 2. Tows of the fibers were cut into 70 mm lengths and were arranged lengthwise in a screen cage or basket, with all the tows and the fibers in the tows being substantially parallel to each other. The cage was a three-sided aluminum mesh cage with an open top measuring 72 mm×12.7 mm×25.4 mm with square mesh openings 6.4 mm on a side. The tows were arranged by hand in a layered fashioned within the cage. The following fiber tows in total amount of 3.9896 grams were stacked:

148 of SiC Synterials brand reinforcing fiber tows weighing 2.3236 g 148 of (C) Thornel P-55 fugitive fiber tows weighing 1.6650 g After the desired weight of the fiber tows was arranged in the cage, a top of similar mesh construction was placed on the fibers on the open side of the cage. The top was gently pressed onto the fiber mass until the fibers were compressed by approximately 25% and held in a lightly constrained manner. The top was then secured in this position using copper wire. Aluminum grids with smaller mesh openings were then wired in place at the ends of the mesh cage to prevent the fibers from falling out during the immersion process in a matrix precursor solution.

The matrix precursor solution was prepared by mixing 195 cc zirconium n-propoxide, 150 cc titanium isopropoxide and 175 cc ethyl alcohol to yield 50 mole percent of each, i.e., zirconium oxide and titanium oxide.

A portion of the matrix precursor solution was poured into a large test tube. The caged preform was lowered into the test tube until completely submerged. The test tube was then stoppered and left in an upright position. The matrix precursor penetrated the air gaps between the fibers and completely coated the fibers with the matrix precursor. The preform was left in the precursor for one hour and the test tube was agitated every 15 minutes to dislodge trapped air bubbles.

Following immersion, the preform was removed from the solution and suspended above a distilled water steam bath, in a drying oven set at 110° C., for a minimum of four hours. During this time, the liquid matrix precursor developed from a metal-alkoxide solution to a collection of Zirconia-and titania-based hydroxyl precipitates. Following this step, the preform was weighed and the immersion/precipitation/weighing process repeated two more times.

After the third immersion/precipitation step the preform, now a semi-rigid body, was placed in a tube furnace for an intermediate low-temperature calcination. The preform was removed from the cage, weighed, placed in an alumina crucible, and put into the tube furnace. The temperature was raised in flowing air to 540° C. at a rate of 5 degrees per minute, held for one hour at temperature, and then cycled down at the same ramp rate. The treatment converted the hydroxyls into oxides (zirconia and titania) and allowed a more accurate estimate of the matrix form weight gain.

Following the first calcination step, special heat treatment was performed to oxidize and remove the fugitive fibers. This treatment used the same tube furnace and ramp rates. Temperature of 700° C. and a time of 48 hours were parameters for this treatment. This treatment completely oxidized the fugitive carbon fibers. The resultant voids left by the oxidation were then filled with matrix precursor during subsequent immersions. In this manner, composites with controlled matrix-rich regions were fabricated.

The immersion/precipitation/calcination cycle was then repeated until the calcined weight indicated that the composite was 35% by volume reinforcing fiber phase. A total of seven immersions and three calcinations were required to generate this fiber loading.

Following the final calcination and determination of the fiber loading in the fiber preform it was then densified via hot pressing. The hot pressing sequence was performed in a reducing carbon monoxide atmosphere, with a slight overpressure of 0.1 atmospheres. The carbon monoxide atmosphere helped limit fiber degradation during exposure to elevated temperatures. The carbon monoxide overpressure was obtained in the chamber prior to the application of either temperature or pressure, and continued until the die assembly had cooled to below 800° C.

The time/temperature hot pressing profile utilized for these ceramic structures were designed for maximum consolidation with minimum fiber degradation. A minimum pressure of 2.3 MPa was maintained to insure load train alignment. Maximum consolidation pressure was 17.25 MPa and was applied for 30 minutes after the temperature had reached 1270° C.

The ceramic structures were cooled to room temperature and mechanical tests were conducted thereon with the load applied in the direction parallel to the enhanced or backfilled matrix channels and compared to a prior art ceramic structure devoid of backfilled matrix with the following results:

| Ceramic Structure | Fiber Loading | Flexure Strength (MPA) | Normalized Work of Fracture |
|---|---|---|---|
| Ex.1 | 35% | 971 ± 30* | 1.48 ± 0.01* |
| Prior art | 50% | 863 ± 11 | 1.00 ± 0.03 |

*± standard error

EXAMPLE 2

This example demonstrates preparation of a ceramic structure of this invention which demonstrates retention of structure integrity on failure.

The ceramic structure herein was prepared in the same manner as in Ex. 1, above. The fibers used in this example were as follows:

150 tows of Synterials brand SiC reinforcing fibers weighing 2.4075 grams 150 tows of Thornel P-55 brand C fugitive fibers weighing 1.7220 grams With load applied in the direction perpendicular to the reinforcing fibers, the following results were obtained;

| Ceramic Structure | Fiber Loading | Flexure Strength (MPa) | Normalized Working-Fracture |
|---|---|---|---|
| Ex.2 | 50% | 546 ± 25* | 0.91 ± 0.01 |
| prior art | 50% | 691 ± 13 | 100 ± 0.01 |

*± standard error

Figure 3A:
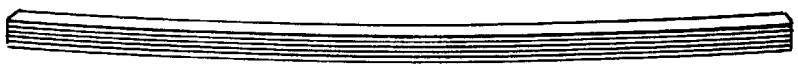
FIG. 3(a) is a side view of a fractured reinforced ceramic structure after removal of load of this invention containing 50% silicon carbide reinforcing fibers in a zirconium titanate matrix demonstrating retention of its structural integrity after failure.
Figure 3B:
FIG. 3(b) is a side view of a fractured prior art reinforced ceramic structure after removal of load containing 50% silicon carbide reinforcing fibers in a zinc titanate matrix demonstrating catastrophic failure of the structure.

While mechanical properties of Ex. 2 of the ceramic structure of this invention is lower than the prior art ceramic structure which was same as the structure of this invention but devoid of the backfilled material, the important characteristic of the novel structure of this invention is that it retained about 50% of the mechanical properties on failure. This is shown in FIGS. 3(a) and 3(b) where the ceramic structure of this invention illustrated in FIG. 3(a) has retained its structural integrity after failure whereas the prior art ceramic structure of Ex. 3(b) has exhibited extensive damage while failing which resulted in loss of structural integrity.

While the invention has been described in detail with reference to preferred embodiments thereof, it is understood that variations and modifications thereof may be made without departing from the true spirit and scope of the invention.

What I claim is:

1. A process for preparing a ceramic structure comprising the steps of:

(a) arranging tows of elongated fugitive and reinforcing fibers parallel to each other to form a fiber preform, the fibers being 1–50 microns in diameter, (b) contacting the fiber preform with a matrix precursor whereby the matrix precursor deposits around the fibers, (c) removing the fiber preform from the matrix precursor wherein the fibers are coated with the matrix precursor, (d) drying the fiber preform to solidify the matrix precursor on the fibers and to convert the matrix precursor to a matrix form, (e) repeating steps (c) and (d) to build-up the matrix precursor/form on the fibers, (f) calcining the fiber preform to convert the matrix form on the fibers to another matrix form, (g) removing the fugitive fibers from the fiber preform to form elongated and parallel channels therein, (h) backfilling the channels with a material, and (i) hot pressing the fiber preform for densification purposes to form the ceramic structure containing spaced fibers and spaced backfilled material disposed in a ceramic matrix.

2. The process of claim 1 wherein said step of contacting the fiber preform with the matrix precursor is carried out by immersing the fiber preform in the matrix precursor.

3. The process of claim 1 wherein said step of removing said fugitive fibers is carried out in an oxidizing atmosphere at 200–1000° C., for 1–200 hours.

4. The process of claim 3 wherein said step of drying is carried out in the presence of steam, said step of calcining is carried out at 500–700° C. in 0.5–2 hours, and said step of hot pressing is carried out in a reducing atmosphere under a pressure of 15–35 PMa at 1200–1300° C. in a period 0.5–2 hours.

5. The process of claim 4 wherein said backfilled material is provided by contacting the fiber preform with the matrix precursor after removal of the fugitive fibers.

6. The process of claim 5 wherein the fugitive fibers are removed after the fiber preform becomes at least semi-rigid and wherein said removing step is carried out at 200–800° C. in 20–100 hours.

* * * * *